United States Patent
Knepp et al.

(10) Patent No.: US 6,273,375 B1
(45) Date of Patent: *Aug. 14, 2001

(54) PAPERBOARD MOUNTING AND DISPLAY CARD FOR A DROP-ON INSTANT SUNGLASS ATTACHMENT

(75) Inventors: Christine F. Knepp, York; Walter H. Peters, Lancaster, both of PA (US)

(73) Assignee: Yorktowne Optical Company, Inc., Emigsville, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,360

(22) Filed: Aug. 17, 1998

(51) Int. Cl.$^7$ ..................................................... A47B 96/06
(52) U.S. Cl. .............................. 248/214; 211/85.1; 206/5
(58) Field of Search .................................. 248/309.1, 214, 248/902; 211/85.1, 59.1; 351/158, 47; 206/5, 6

(56) References Cited

U.S. PATENT DOCUMENTS

| | | | |
|---|---|---|---|
| D. 323,069 | * 1/1992 | Leese | D6/315 |
| 2,212,596 | 8/1940 | Fuller . | |
| 2,656,918 | * 10/1953 | Hollis | 248/902 X |
| 2,723,745 | * 11/1955 | McNeill | 206/5 |
| 2,764,286 | * 9/1956 | Carmichael | 206/5 |
| 3,040,881 | * 6/1962 | McNeill | 206/80 |
| 3,065,946 | * 11/1962 | Berkow | 248/309.1 |
| 3,116,829 | 1/1964 | Pacelli . | |
| 3,381,806 | * 5/1968 | Mcdonagh | 248/902 X |
| 3,458,093 | * 7/1969 | Bacharach | 248/214 |
| 3,650,442 | * 3/1972 | Berns et al. | 223/87 |
| 5,129,617 | * 7/1992 | MacWilliamson | 211/85.1 X |
| 5,141,104 | * 8/1992 | Morrow et al. | 351/158 X |
| 5,260,726 | * 11/1993 | Nyman | 351/158 |
| 5,340,074 | * 8/1994 | Porcaro et al. | 248/902 X |
| 5,423,505 | 6/1995 | David . | |
| 5,464,094 | 11/1995 | LeHaye . | |
| 5,650,836 | 7/1997 | Strauss et al. . | |

* cited by examiner

Primary Examiner—Ramon O. Ramirez
Assistant Examiner—Kimberly Wood
(74) Attorney, Agent, or Firm—Nixon Peabody LLP; Donald R. Studebaker

(57) ABSTRACT

Display cards are provided for displaying sunglass attachments for eyeglasses, specifically inexpensively produced mountings to display a drop-on sunglass attachment from a display rod that allow a prospective purchaser to sample the drop-on sunglass attachment prior to purchasing without removal of the drop-on sunglass attachment from the display card. An upper and lower substantially rectangular, planar members slightly greater in width than a drop-on sunglass attachment are provided, including a horizontal slot located in the upper member for receiving a molded hook in the top of the drop-on sunglass attachment. The lower member has essentially equal dimensions as the upper member, and hingedly connects to the upper member through a thin segment only as wide as the nosepiece of the drop-on sunglass attachment. Upon engaging the horizontal slot of the upper member with the molded in hook of the sunglass attachment, the lower member can be folded through an arc, engaging the bridge of the sunglass attachment through the thin segment of the base planar member, and mating with the upper member, securing the sunglass attachment between the lower and upper members. Thus attached, the display card does not interfere with the test fitting of the sunglass attachment. The display card contains a hole that can be selectively engaged with a cantilevered merchandising display rod.

18 Claims, 3 Drawing Sheets

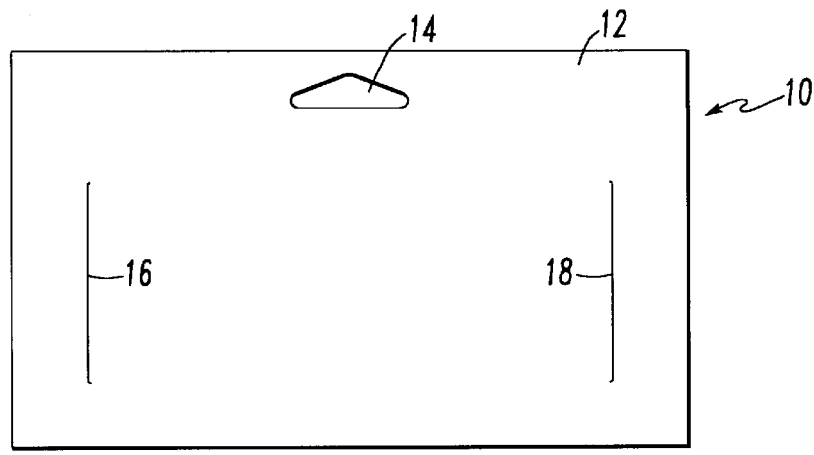
FIG.1
PRIOR ART
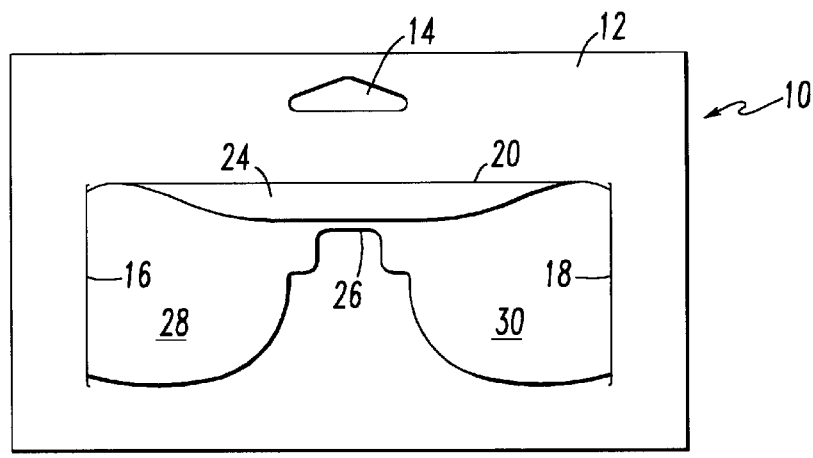
FIG.2A
PRIOR ART
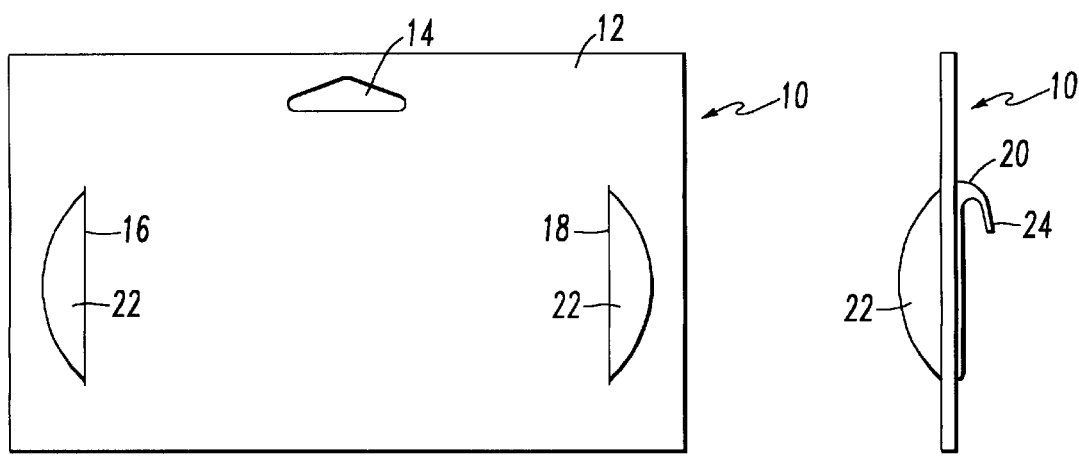
FIG.2B
PRIOR ART
FIG.2C
PRIOR ART

PAPERBOARD MOUNTING AND DISPLAY CARD FOR A DROP-ON INSTANT SUNGLASS ATTACHMENT

TECHNICAL FIELD

The present invention is directed generally to mountings and display cards for displaying and selectively mounting non-prescription drop-on sunglass attachments for eyeglasses on a substantially horizontally extended cantilevered arm, and specifically to an easily and inexpensively produced mounting to display a drop-on sunglass attachment from a cantilevered display assembly that allows a prospective consumer to sample the drop-on sunglass attachment prior to purchasing without removal of the drop-on sunglass attachment from the display card.

BACKGROUND OF THE INVENTION

The display for sale of novelty items such as drop-on sunglass attachments presents several difficulties. It is highly desirable for a prospective purchaser to try on the drop-on sunglass attachment prior to purchasing, in order to ensure a proper fit, appearance, and utility. Accommodating prospective sampling of the product by the purchaser by allowing removal of the product from the packaging has presented several problems. The most obvious problem is theft of the product; removal of the product from the packaging enables a nefarious individual to easily hide the product in his or her baggage or on his or her person, or to wear the product out of the store. A less obvious but nevertheless a costly problem is the store employee labor required to repackage a product that has been removed from its packaging by a prospective purchaser, only to be set down without being repackaged by the purchaser after he or she has decided not to purchase the product.

The prior art has addressed some of the problems that accompany paperboard card and display packaging design. For example, U.S. Pat. No. 5,650,836 to Strauss et al. discloses a hanger with temple support for display of eyeglasses. The hanger includes a central portion and a pair of opposing arms that extend down toward the temples of the eyeglasses. The hanger also includes a respective temple panel at each arm of the hanger and connected therewith by a hinge permitting the panel to swing with reference to each arm. The panel further includes a plurality of openings through which the temples of the glasses are threaded, such that the panels pivot around the hanger hinges along with the pivoting temples and pivot with respect to the arms of the hanger. U.S. Pat. No. 5,423,505 discloses a similar arrangement. While supporting novelty glasses by the temples is appropriate for eye wear that has temples, such a method would not be adaptable to clip-on or drop-in attachments for eyeglasses.

U.S. Pat. No. 3,116,826 to Pacelli discloses a pilfer-proof display package for sunglasses adapted to enable a prospective purchaser to test-fit the sunglasses prior to purchase without removing from the package. The display package comprises a shaped transparent receptacle comprising a bottom wall and a side wall for receiving the frame and lenses of a pair of sunglasses and extending therearound. The receptacle has attached to it a card for imprinting trademark and product sales data; the card has a hole to allow display on a sales display rod. The receptacle is open on the sides to allow the temples of the sunglasses to protrude, allowing the prospective purchaser to try on the sunglasses. When used in this mode, the transparent receptacle allows the prospective purchaser to view through the lenses to evaluate the product for suitability. This invention, however, does not allow the prospective purchaser to sample the true fit and feel of the sunglasses, nor does it allow an unobstructed view through the lenses of the sunglasses. A second embodiment of this invention is a display package for a pair of clip-on sunglasses that includes clips and a nose piece. This embodiment comprises connected hollow members that generally contain the clip-on sunglass attachment, while allowing the clips and nose piece of the clip-on sunglasses to protrude from the package. In this configuration, the clip-on sunglasses may be fitted to a prospective purchaser's glasses without removing the product from the packaging; however, this will still not allow a prospective purchaser to sample an unobstructed view through the lenses.

A prior art display card exists for displaying a drop-on sunglass attachment as illustrated in FIG. 1. This prior art card is rectangular, and slightly wider than the drop-on sunglass attachment. The card has a hole near the top edge centrally located between the right and left sides that can engage a horizontal display rod. As shown in FIG. 2, the card includes a vertical slit on the right and left sides that receive the swept-back "wings" of the drop-on sunglass attachment. The sunglass attachment must be removed from the display card by the prospective purchaser in order to try on the sunglass attachment. If the prospective purchaser removes the sunglass attachment from the display card and subsequently decides not to purchase the product, it is likely that the sunglass attachment will not be properly replaced in the display card, necessitating store labor to properly rehang the sunglass attachment. Further, because the sunglass attachment hangs freely from the display card, errant contact by customers or employees may dislodge the sunglass attachment, causing it to fall.

A need exists, therefore, for an easily and inexpensively produced mounting to display a drop-on sunglass attachment that allows a prospective consumer to sample the sunglass attachment prior to purchasing without removal of the sunglass attachment from the display card.

SUMMARY OF INVENTION

It is a primary object of the present invention, therefore, to overcome the disadvantages of the prior art and provide a mounting to display a drop-on sunglass attachment that allows a prospective consumer to sample the sunglass attachment prior to purchasing without removal of the sunglass attachment from the display card.

It is another object of the present invention to provide an easily and inexpensively produced mounting to display a drop-on sunglass attachment that allows a prospective consumer to sample the sunglass attachment prior to purchasing without removal of the sunglass attachment from the display card.

It is a further object of the present invention to provide an aesthetically pleasing mounting to display a drop-on sunglass attachment that allows a prospective consumer to sample the sunglass attachment prior to purchasing without removal of the sunglass attachment from the display card.

The aforesaid objects arc achieved by providing a display card for supporting and displaying a drop-on sunglass attachment, the sunglass attachment including a horizontally extending hook positioned over two lenses attached by a bridge, the display card having a substantially planer central region having a bottom edge, a top edge and laterally opposed side edges, an elongated slit extending between said side edges and spaced from the bottom edge a distance less than the distance between the hook and the bridge of the sunglass attachment such that the sunglass attachment can be positioned on a pair of glasses without removing the sunglass attachment from the display card. The display card preferably further includes a second portion hingedly connected to a bottom edge of the above described first portion by way of a hinged section for positively positioning the sunglass attachment with respect to the first portion. The second portion including a substantially planar central region, a bottom edge adjacent the bottom edge of the first portion, a top edge, laterally opposed side edges as well as cutouts formed along the bottom edge of the second portion for receiving a portion of the sunglass attachment when the second portion is overfolded along the hinged section formed between the cutouts and into contact with a back side of the first portion. Preferably, the hinged section is of a length less than a length of the bridge interconnecting the lenses.

Other objects and advantages will be apparent from the following detailed description when read in the light of the several figures.

BRIEF DESCRIPTION OF THE DRAWINGS

FIG. 1 is an elevational view of a prior art display card blank.

FIG. 2a is a front elevational view of a typical drop-on sunglass attachment engaged in the card blank of FIG. 1.

FIG. 2b is a back elevational view of a typical drop-on sunglass attachment engaged in the card blank of FIG. 1.

FIG. 2c is a side elevational view of a typical drop-on sunglass attachment engaged in the card blank of FIG. 1.

DETAILED DESCRIPTION OF THE PREFERRED EMBODIMENTS

Figure 3:
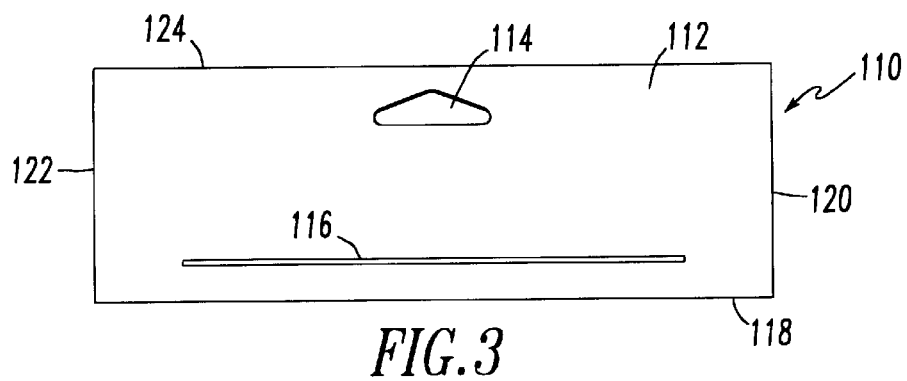
FIG. 3 is an elevational view of a display card formed in accordance with the present invention.

The present invention provides an easily and inexpensively produced mounting to display a drop-on sunglass attachment from a cantilevered display assembly that allows a prospective consumer to sample the drop-on sunglass attachment prior to purchasing without removal of the drop-on sunglass attachment from the display card.

Referring again to the prior art display card 10 illustrated in FIG. 1, this display card includes a substantial planner front surface which may readily receive indicia and advertising material relating to the sunglass attachment. As noted previously, the display card 10 includes an opening 14 for receiving a cantilevered arm of a standard display rack. In order to secure the sunglass attachment with respect to the display card 10, vertically extending slits 16 and 18 are provided which as noted herein above retain the wings of the sunglass attachment. Particularly, the sunglass attachment 20 is maintained in the position illustrated in 2a by inserting the wings of the sunglass attachment through the display card 10 as is apparent from FIG. 2b. FIG. 2b illustrates the wings 22 of the sunglass attachment 20 extending through the slits 16 and 18 respectively. This positioning of the sunglass attachment 20 is readily apparent from FIG. 2c. Additionally, as can be noted from FIG. 2c the sunglass attachment includes a hook 24, the significance of which will become apparent from the following description. With reference now to FIGS. 3 and 4a through 4c, initial embodiment of the present invention will be described in detail.

Like the prior art display card 10, the display card 110 includes a substantially planer front surface 112 which, may readily receive indicia or other advertising material, and includes an opening 114 therein for receiving the cantilever hanger arm of the conventional display structure. Unlike the previous display card 10, the display card 110 includes a substantially horizontal slot 116 which extends a majority of the length of the display card 110 and is positioned adjacent to a bottom edge 118 of the card. Card 110 further includes opposing lateral edges 120 and 122 as well as a top edge 124. Preferably, the display card 110 is formed of a paper board material, the thickness of which may vary dependant upon the display characteristics.

As can be seen from FIG. 4a, the display card 110 readily receives the hook 24 of the sunglass attachment 20 while the bridge of the sunglass attachment 26 is exposed below the bottom edge 118 of the display card 110. The bridge 26 separates the lenses 28 and 30 from one another and is exposed so as to allow the sunglass attachment to be tried on by the consumer without removing the sunglass attachment 20 from the display card 110. As can be seen from FIGS. 4b and 4c, the hook 24 of the sunglass attachment 20 is readily received in the slot 116 in order to positively position the sunglass attachment 20 with respect to the display card 110. In addition to the slot 116 for receiving the hook 24 of the sunglass attachment 20, a mechanism for fixing the sunglass attachment 20 with respect to the display card 110 may be provided. This mechanism for fixing the sunglass attachment 20 with respect to the display card 110 may be in the form of a transparent tape 126 which adheres to an upper portion of the sunglass attachment 20 and a back surface 128 of the display card 110. While it is not necessary to provide such a securing mechanism for fixing the sunglass attachment 20 with respect to the display card 110, this adds further assurance that when the sunglass attachment 20 is handled by the consumer, the sunglass attachment will remain in place with respect to the display card 110.

Figure 4A:
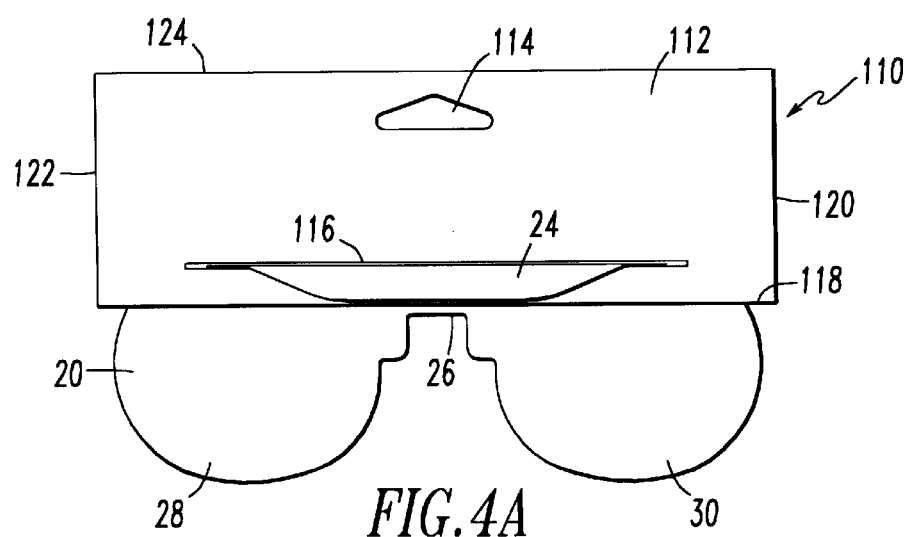
FIG. 4a is a front elevational view of a drop-on sunglass attachment engaged in the card of FIG. 3.
Figures 4B, 4C:
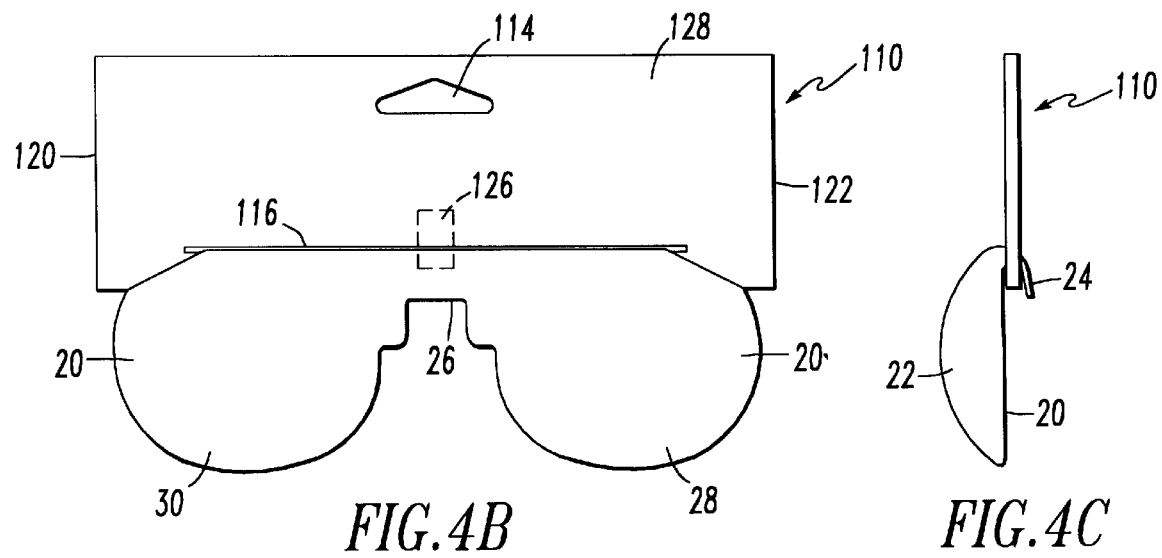
FIG. 4b is a back elevational view of a drop-on sunglass attachment engaged in the card of FIG. 3.
FIG. 4c is a side elevational view of a drop-on sunglass attachment engaged in the card of FIG. 3.

As can be appreciated from FIGS. 4a through 4c, the sunglass attachment 20 in its fixed position on the display card 110 may be readily positioned on the eyeglasses of the consumer without removing the sunglass attachment 20 from the display card 110, as is required with the prior art display card illustrated in FIG. 1. That is, because the bridge 26 extends below the bottom edge 118 of the display card 110, the sunglass attachment 20 may be positioned in a conventional manner on the glasses of the consumer so that the consumer can test the sunglass attachment 20 without the view through the sunglass attachment being obstructed in any manner.

With reference now to FIGS. 5 and 6a through 6c, a further and preferred embodiment of the present invention will be described in greater detail.

Figure 5:
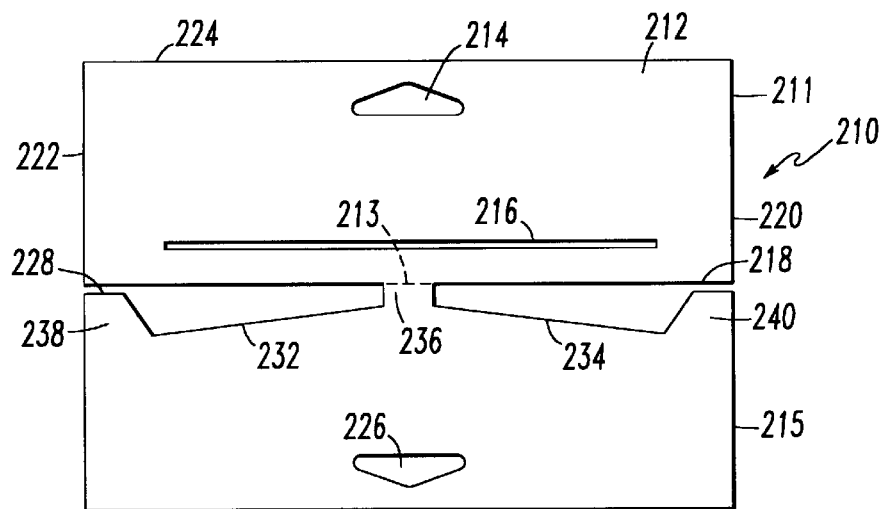
FIG. 5 is an elevational view of a display card formed in accordance with an alternative embodiment of the present invention.

As shown in FIG. 5, the display card 210 includes an upper portion 211 which is substantially identical to the display card 110 illustrated in FIG. 3. Hingedly connected to the upper portion 211 by way of crease score fold line 213 is a lower portion 215. The upper portion includes a front surface 212 which as with the previous embodiment may readily receive indicia or other advertising material thereon. Centrally located in an upper region of the upper portion 211 is an opening 214 for receiving the cantilevered hanging arm of a conventional display structure. Additionally, as with the previous embodiment, the upper portion 211 includes an elongated slot 216 positioned adjacent a bottom edge 218 and which extends a majority of the length of the display card 210. The upper portion tool level of the display card 210 further includes opposed lateral side edges 220 and 222 as well as a top edge 224 which extends substantially parallel to the bottom edge 218.

In addition to the upper portion 211, the bottom portion 215 includes an opening 226 which is substantially identical to the opening 214 which when the lower portion 215 is folded along the crease score fold line 213, aligns with the opening 214, the significance of which will be described in greater detail here and below. The lower portion 215 further includes what can be described as a bottom edge 228 and top edge 230. While the illustrations set forth in FIG. 5 would dictate that the edge 228 be referred to as a top edge and a edge 230 be referred to as a bottom edge, the edges are referred to in the reverse so as to coincide with the edges of the upper portion 211 when the lower portion 215 is folded along the crease score fold line 213 and pivoted 180 degrees into contact with the upper portion 211. The significance of which will be described in greater detail here and below.

Figure 6A:
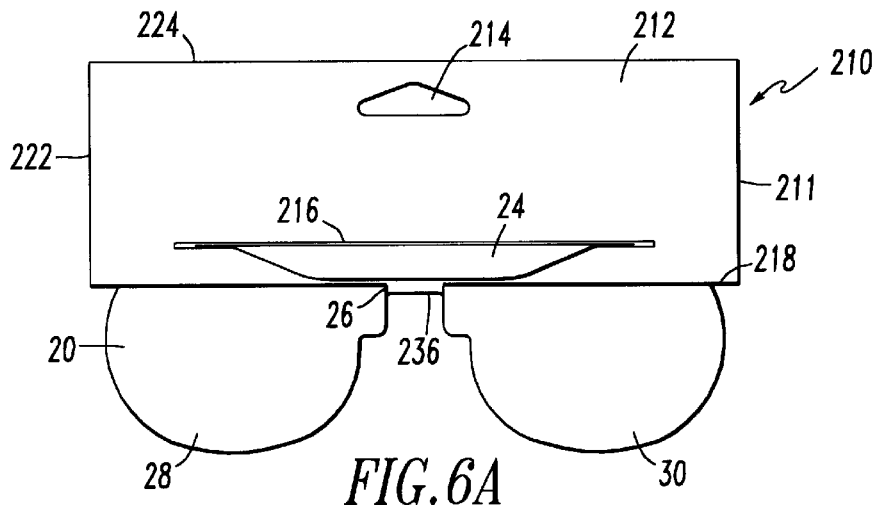
FIG. 6a is a front elevational view of a drop-on sunglass attachment engaged in the card of FIG. 5.
Figure 6B:
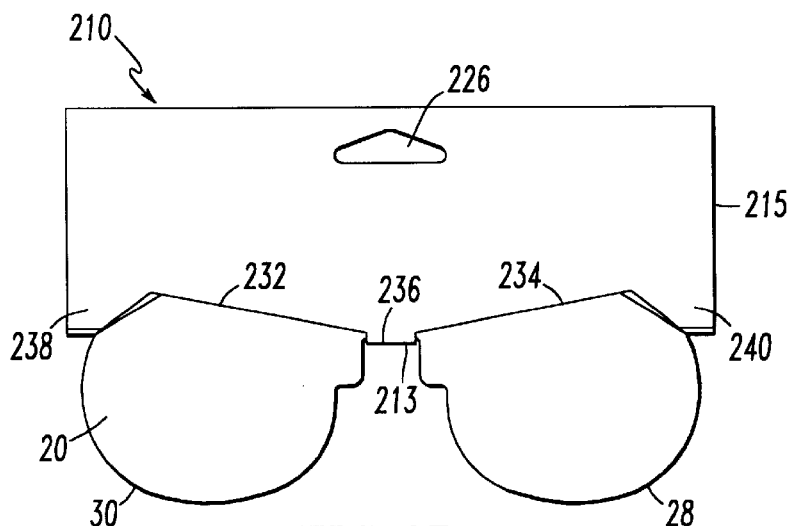
FIG. 6b is a back elevational view of a drop-on sunglass attachment engaged in the card of FIG. 5.
Figure 6C:
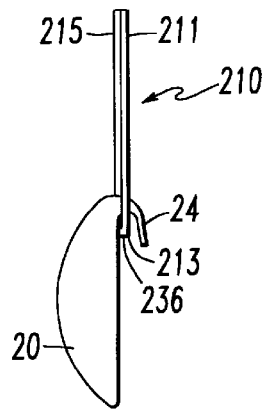
FIG. 6c is a side elevational view of a drop-on sunglass attachment engaged in the card of FIG. 5.

In this regard, the bottom edge 228 includes cutouts 232 and 234 which receive portions of the sunglass attachment 20 when the hook 24 of the sunglass attachment 20 is positioned within the elongated slot 216. Separating the cut-outs 232 and 234 is connection 236 which connects the lower portion 215 with the upper portion 211. The dimension of the connection 236 must be of a length less than that of the bridge portion 26 of the sunglass attachment 20. Further, flanking each of the cut-outs 232 and 234 are extensions 238 and 240 which aid in positioning the sunglass attachment with respect to the display card 210. With reference now to FIGS. 6a through 6c, the positive positioning of the sunglass attachment 20 within the display card 210 will be described in greater detail.

Initially, the sunglass attachment 20 is extended into the cut-outs 232 and 234 with the hook 24 of the sunglass attachment 20 extending through the slot 216 of the upper portion 211 of the display card 210. Once the hook 24 is extended through the slot 216, the lower portion 215 of the display card 210 is folded along a crease score fold line 213 and pivoted 180 degrees into contact with a back surface of the upper portion 211. In this regard, the lower portion 215 may be adhesively secured to the upper portion 211 of the display card 210. Alternatively, if a coated paperboard material is utilized, the lower portion 215 of the display card 210 may be heat sealed to the upper portion 211. Alternatively, other methods of securing the surfaces to one another may be utilized. As can be seen from FIGS. 6a and 6b, the connection 236 extends below and around the bridge 26 of the sunglass attachment 20. This positively positions the sunglass attachment 20 with respect to the display card 210. This feature may be better illustrated in FIG. 6b. Thus, herein it is noted that the sunglass attachment 20 readily extends through the cut-outs 232 and 234 with the extensions 238 and 240 being positioned adjacent the back surface of the upper portion 211. Additionally, it can be appreciated that the opening 226 aligns with the opening 214 in order to allow the display card 210 to be readily positioned in a conventional display structure. As can be appreciated from FIG. 6c, the hook 24 extends through the slot 216, while the lower portion 215 having been folded along the crease score line 213 is pivoted 180 degrees and into contact with a back surface of the upper portion 211 and secured thereto. Again as with the previous embodiment, the consumer may readily remove the display card 210 including the sunglass attachment 20 from a display structure and position the sunglass attachment 20 in a conventional manner on their eyeglasses in order to test the sunglass attachment 20 without removing the sunglass attachment 20 from the display card 210. The hook 24 of the sunglass attachment 20 readily rests on the upper portion of the consumer sunglasses as it would if the display card 210 was not present.

While the display cards 110 and 210 are illustrated as accommodating the particular configuration of the sunglass attachment 20, it can be appreciated that other configurations of sunglass attachments 20 may be accommodated within a display card of similar construction without departing from the spirit and scope of the present invention.

In the previous detailed description of the preferred embodiment, reference is made to the accompanying drawings which form a part hereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The previous detailed description is, therefore, not to be taken in a limited sense.

We claim:

1. A display card for supporting and displaying on a substantially horizontal rod a drop-on sunglass attachment for a pair of spectacles, the sunglass attachment including a horizontally extending hook above two attached lenses located over a nose bridge, said display card comprising:

a substantially planar upper member having a top edge, a bottom edge and laterally opposing side edges;

an elongated slot adjacent to and extending along a majority of a length of said bottom edge of said planar upper member for receiving the sunglass attachment hook;

a substantially planar lower member having a top edge, a bottom edge and opposing lateral edges; and connection means for hingedly connecting said planar lower member to said planar upper member and for securing a portion of the drop-on sunglass attachment without interfering with the test-fitting of the drop-on sunglass attachment.

2. The display card of claim 1, wherein the entire display card, including said upper planar member and said lower planar member, is formed from a single piece of material.

3. The display card as defined in claim 1, wherein said display card is formed of a paperboard material.

4. The display card as defined in claim 1, further comprising means for hanging said display card from a horizontal display rod, said means including a hole in at least one of said planar members.

5. The display card as defined in claim 1, wherein said upper member and said lower member are adhered to one another.

6. A drop on sunglass attachment and a display card for supporting and displaying said drop-on sunglass attachment, said sunglass attachment including a horizontally extending hook positioned over two lenses attached by a bridge having a width, and said display card comprising:

a substantially planar central region having a bottom edge, a top edge and laterally opposed side edges; and an elongated slit extending between said side edges and adjacent said bottom edge of said substantially planar central region, said sunglass attachment being received in said elongated slit such that said sunglass attachment is mountable for test-fitting on a pair of glasses without removing said sunglass attachment from said display card.

7. The drop on sunglass attachment and display card in claim 6, further comprising an opening adjacent said top edge for receiving a supporting element of a display structure.

8. The drop on sunglass attachment and display card as defined in claim 6, wherein said elongated slit extends over a majority of the length of said display card.

9. The drop on sunglass attachment and display card as defined in claim 6, wherein said display card is formed of a paperboard material.

10. The drop on sunglass attachment and display card as defined in claim 6, wherein said substantially planar central region defines a first portion of said display card.

11. The drop on sunglass attachment and display card as defined in claim 10, further comprising a second portion hingedly connected to said first portion by way of a hinged section for positively positioning the sunglass attachment with respect to said first portion.

12. The drop on sunglass attachment and display card as defined in claim 11, wherein said second portion is hingedly connected to said bottom edge of said first portion.

13. The drop on sunglass attachment and display card as defined in claim 12, wherein said second portion includes a substantially plan a central region, a bottom edge adjacent said bottom edge of said first portion, a top edge and laterally opposed side edges.

14. The drop on sunglass attachment and display card as defined in claim 13, said first and second portions further comprising an opening adjacent each of said top edges of said respective portions for receiving a supporting element of a display structure.

15. The drop on sunglass attachment and display card as defined in claim 14, said display card further comprising cut outs formed along said bottom edge of said second portion for receiving said sunglass attachment when said second portion is overfolded along said hinged section and into contact with a back side of said first portion.

16. The drop on sunglass attachment and display card as defined in claim 15, wherein said second portion is secured to said first portion.

17. The drop on sunglass attachment and display card as defined in claim 15, wherein said hinged section extends between said cutouts.

18. The drop on sunglass attachment and display card as defined in claim 17, wherein said hinged section is of a length less than said length of said bridge interconnecting said lenses.

* * * * *